(12) United States Patent
Hansen et al.

(10) Patent No.: US 6,315,230 B1
(45) Date of Patent: Nov. 13, 2001

(54) TAPE REEL ASSEMBLY WITH WASHER GUARD FOR A DATA STORAGE TAPE CARTRIDGE

(75) Inventors: Carter J. Hansen; William D. Lewis, both of Wahpeton, ND (US)

(73) Assignee: Imation Corp., Oakdale, MN (US)

( * ) Notice: Subject to any disclaimer, the term of this patent is extended or adjusted under 35 U.S.C. 154(b) by 0 days.

(21) Appl. No.: 09/542,533

(22) Filed: Apr. 4, 2000

(51) Int. Cl.[7] .................................................. G03B 23/02
(52) U.S. Cl. ........................ 242/348; 242/118.6; 360/132
(58) Field of Search ..................................... 242/341, 342, 242/340, 338, 343, 343.1, 343.2, 345.1, 348, 118.6, 118.61, 608.2, 608.8, 609.4, 612; 360/132

(56) References Cited

U.S. PATENT DOCUMENTS

| | | |
|---|---|---|
| 4,775,115 | 10/1988 | Gelardi . |
| 4,879,614 * | 11/1989 | Nakagome ........................ 360/132 X |
| 5,027,249 * | 6/1991 | Johnson et al. ...................... 360/132 |
| 5,323,984 * | 6/1994 | Lackowski ............................. 242/348 |
| 5,400,981 | 3/1995 | Rambosek et al. . |
| 5,618,005 * | 4/1997 | Todd et al. ........................ 242/345.1 |
| 5,657,937 | 8/1997 | Todd et al. . |
| 5,826,811 * | 10/1998 | Melbye et al. ..................... 242/343 X |
| 5,871,166 * | 2/1999 | Doninelli .............................. 242/340 |
| 6,043,963 * | 3/2000 | Eaton .................................... 360/132 |
| 6,264,126 * | 7/2001 | Shima et al. .......................... 242/343 |

\* cited by examiner

Primary Examiner—William A. Rivera
(74) Attorney, Agent, or Firm—Eric D. Levinson (57) ABSTRACT

A tape reel assembly for maintaining a data storage tape. The tape reel assembly includes a hub ring, an engagement section, a metallic ring and opposing flanges. The hub ring defines a tape-winding surface and forms a central opening. The engagement section extends substantially radially inwardly relative to the tape-winding surface and includes an inner surface, an outer surface and an annular flange. The annular flange extends substantially axially from the outer surface and defines an axial passage. The metallic ring is secured to the outer surface of the engagement section and has an inner diameter. In this regard, the inner diameter of the metallic ring is greater than a diameter of the axial passage such that the annular flange extends axially within the inner diameter of the metallic ring. Finally, the opposing flanges extend radially from opposite ends of the hub ring, respectively. With this configuration, the annular flange protects the metallic ring from accidental contact with a tape drive post during use. In addition, the annular flange serves to co-axially align a drive assembly with the tape-winding surface, thereby improving cartridge performance.

20 Claims, 7 Drawing Sheets

TAPE REEL ASSEMBLY WITH WASHER GUARD FOR A DATA STORAGE TAPE CARTRIDGE

BACKGROUND OF THE INVENTION

The present invention relates to a tape reel assembly for a data storage tape cartridge. More particularly, it relates to a tape reel assembly configured to improve cartridge performance and minimize damage to an associated metallic washer during use.

Data storage tape cartridges have been used for decades in the computer, audio and video fields. The data storage tape cartridge continues to be an extremely popular form of recording large volumes of information for subsequent retrieval and use.

A data storage tape cartridge generally consists of an outer shell or housing maintaining at least one tape reel assembly and a length of magnetic storage tape. The storage tape is wrapped about a hub portion of the tape reel assembly and is driven through a defined tape path by a driving system. The housing normally includes a separate cover and base, the combination of which forms an opening (or window) at a forward portion thereof for allowing access to the storage tape by a read/write head upon insertion of the data storage tape cartridge into a tape drive. This interaction between storage tape and head may take place within the housing (for example, with a mid-tape load design), or the storage tape may be directed away from the housing to an adjacent area at which the read/write head is located (for example, with a helical drive design or a leader block design). Where the tape cartridge/drive system is designed to direct the storage tape away from the housing, a single tape reel assembly is normally employed. Conversely, where the tape cartridge/drive system is designed to provide head/storage tape interaction within or very near the housing, a two- or dual-tape reel assembly configuration is typically utilized.

Regardless of the number of tape reel assemblies associated with a particular data storage tape cartridge, the tape reel assembly itself is generally comprised of three basic components; namely, an upper flange, a lower flange, and a hub body. The hub body forms an outer, tape-winding surface about which the storage tape is wound. The flanges are disposed at opposite ends of the hub, and are spaced to approximate the height of the storage tape. With most available tape reel assemblies, the hub body includes a cylindrical hub ring and a radial engagement section or web. The hub ring defines the tape-winding surface and forms a central opening sized to slidably receive a brake body. The engagement section extends radially inwardly from the hub ring at one end thereof. The engagement section typically includes an interior, toothed surface formed to selectively engage teeth formed on the brake assembly to "lock" the tape reel assembly to the housing. The brake assembly is accessible through a passage formed in the engagement section. Thus, upon insertion into a tape drive, a post or spindle portion of a drive hub extends through the passage and contacts the brake assembly, directing the brake assembly from the locked position.

To facilitate engagement between the tape reel assembly and the drive hub, the tape reel assembly typically further includes a metallic washer or ring, whereas the drive hub includes a corresponding magnet. The metallic ring is secured to an outer surface of the engagement section, generally axially aligned with the tape-winding surface. The magnet is reciprocally located along the drive hub. So as to maximize magnetic force between the metallic ring and the magnet, the metallic ring is formed to be as large as possible. In this regard, the metallic ring typically has an inner diameter smaller than a diameter of the passage formed in the engagement section. As a result, during use, the inner diameter surface of the metallic ring is the surface proximate or "closest" to the drive post as the post is inserted into, and retracted from, the tape reel assembly.

The hub body and the metallic ring are normally formed to satisfy tight tolerance requirements. However, inherent manufacturing/assembly constraints may result in the metallic ring not being precisely axially aligned with the hub body, and in particular the tape-winding surface. This variability in co-axial alignment between the metallic ring and the tape-winding surface may negatively affect performance of the data storage tape cartridge due to changes in relative velocity as the hub rotates. In addition, during tape drive engagement, because the inner diameter surface of the metallic ring is effectively "exposed" relative to the drive hub post, it is possible that the post will undesirably contact an edge of the misaligned metallic ring. Alternatively, the drive itself may be misaligned, again resulting in the post undesirably contacting the "exposed" metallic ring. Contact between the metallic ring and the drive hub post may damage one or both of the components. In addition, as the post is retracted from the tape reel assembly, the post may contact and pull or force the metallic ring away from the tape reel hub. Beyond the obvious damage to the tape reel assembly, the removed metallic ring may remain affixed to the drive hub magnet, requiring the user to stop tape drive operations while waiting for a service technician to repair the tape drive.

Data storage tape cartridges are important tools used to maintain vast amounts of information. To remain competitive, data storage tape cartridge manufacturers must continually improve cartridge performance while reducing manufacturing costs. To this end, use of readily available metallic rings does optimize costs, but may lead to unexpected cartridge damage and/or alignment concerns. Therefore, a need exists for a tape reel assembly including a metallic ring guard.

SUMMARY OF THE INVENTION

One aspect of the present invention relates to a tape reel assembly for use with the data storage tape cartridge. The tape reel assembly includes a hub ring, an engagement section, a metallic ring and opposing flanges. The hub ring defines a tape-winding surface and forms a central opening. The engagement section extends substantially radially inwardly relative to the tape-winding surface and includes an inner surface, an outer surface and an annular flange. The annular flange extends substantially axially from the outer surface and defines an axial passage. The metallic ring is secured to the outer surface of the engagement section and has an inner diameter that is greater than a diameter of the axial passage. With this configuration, the annular flange extends axially within the inner diameter of the metallic ring. Finally, the opposing flanges extend radially from opposite ends of the hub ring, respectively. During use, the annular flange physically protects the metallic ring from coming into contact with any object, such as a drive chuck post, that is axially inserted into, or retracted from, the axial passage. To this end, the annular flange effectively separates the inner diameter of the metallic ring from the object entering the axial passage such that the annular flange is proximate the object. In one preferred embodiment, the annular flange is configured to coaxially position the metallic ring relative to the tape-winding surface.

Another aspect of the present invention relates to a data storage tape cartridge including a housing, at least one tape reel assembly, and a storage tape. The housing defines an enclosure. The tape reel assembly is disposed within the enclosure and includes a hub ring, an engagement section, a metallic ring and opposing flanges. The hub ring defines a tape-winding surface and forms a central opening. The engagement section extends substantially radially inwardly relative to the tape-winding surface and includes an inner surface, an outer surface and an annular flange. The annular flange extends substantially axially from the outer surface to define an axial passage. The metallic ring is secured to the outer surface of the engagement section and has an inner diameter that is greater than a diameter of the axial passage. With this configuration, the annular flange extends axially within the inner diameter of the metallic ring. The opposing flanges extend radially from opposite ends of the hub ring, respectively. Finally, the storage tape is wound about the tape-winding surface. During use, the data storage tape cartridge is inserted into a tape drive. The tape drive includes a drive chuck having a central post. Upon engagement with the tape drive, the post is axially inserted into, and retracted from, the axial passage. The annular flange serves to prevent the post from contacting the metallic ring, thereby preventing damage thereto.

Yet another aspect of the present invention relates to a tape reel assembly for use with a data storage tape cartridge. The tape reel assembly includes a hub body, a metallic ring, a guard, and first and second flanges. The hub body includes a hub ring and an engagement section. The hub ring defines a tape winding surface and opposing first and second ends. The engagement section extends substantially radially inwardly relative to the tape-winding surface adjacent the first end, and includes an inner surface and an outer surface. The hub body forms a central opening for receiving a brake body, the central opening being accessible through an axial passage in the engagement section. The metallic ring is secured to the outer surface of the engagement section such that the metallic ring is generally axially aligned with the central opening. In this regard, the metallic ring defines leading and trailing inner edges, with the leading inner edge being positioned adjacent the engagement section. The guard is positioned to encompass the leading inner edge of the metallic ring. In particular, the guard is configured to substantially prevent a drive chuck post from contacting the leading inner edge upon insertion into the central opening. Finally, the first and second flanges extend radially outwardly from the first and second ends of the hub ring, respectively. In one preferred embodiment, the guard is an annular flange formed along the engagement section.

DESCRIPTION OF THE PREFERRED EMBODIMENTS

Figure 1:
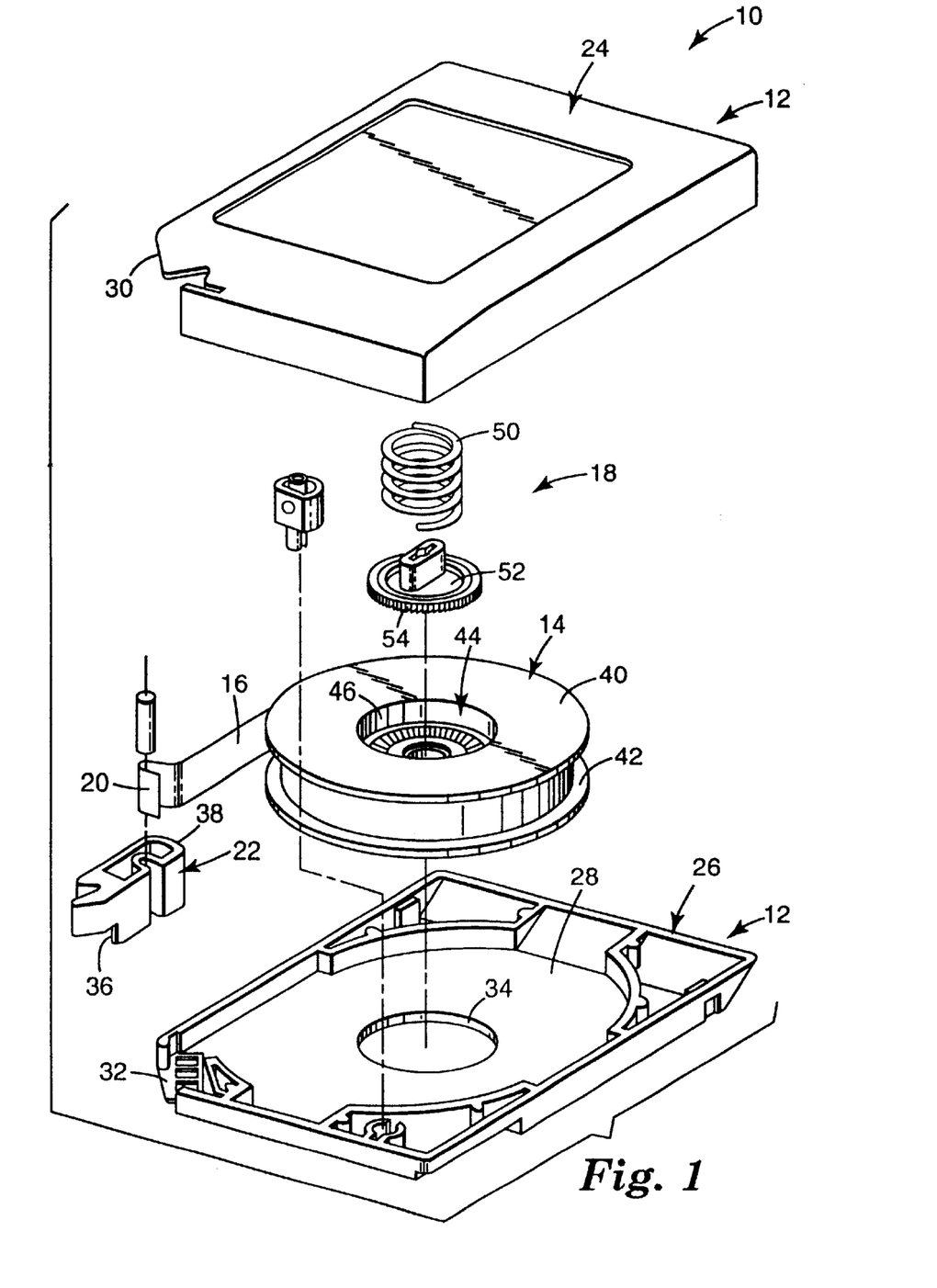
FIG. 1 is an exploded, perspective view of a data storage tape cartridge in accordance with the present invention.

One preferred embodiment of a data storage tape cartridge 10 is shown in FIG. 1. Generally speaking, the data storage tape cartridge 10 includes a housing 12, at least one tape reel assembly 14, a storage tape 16, and a brake assembly 18. The tape reel assembly 14 is disposed within the housing 12. The storage tape 16, in turn, is wound about a portion of the tape reel assembly 14 and includes a free-end 20 attached to a leader block 22. Finally, the brake assembly 18 is centrally positioned within a portion of the tape reel assembly 14 and is connected to a portion (not shown) of the housing 12.

The housing 12 is sized in accordance with industry-accepted tape drive form factors. Thus, the housing 12 can assume a form factor size of approximately 125 mm=110 mm=21 mm, although other form factors or dimensions are equally acceptable. With this in mind, the housing 12 is defined by a first housing section 24 and a second housing section 26. In one preferred embodiment, the first housing section 24 provides a cover, whereas the second housing section 26 serves as a base. It should be understood that as used throughout this specification, directional terminology, such as "cover," "base," "upper," "lower," "top," "bottom," etc., are used for purposes of illustration only, and are in no way limiting.

The first and second housing sections 24, and 26 are configured to be reciprocally mated to one another to define an enclosure 28 for maintaining various other components of the data storage tape cartridge 10. The housing 12 is preferably generally rectangular, except for one corner 30, which is angled and forms a leader block window 32. The leader block window 32 is configured to hold the leader block 22 and serves as an opening for the storage tape 16 to exit from the enclosure 28 such that the storage tape 16 can be threaded to a tape drive (not shown) when the leader block 22 is removed from the leader block window 32. Conversely, when the leader block 22 is snapped into the leader block window 32, the leader block window 32 is covered.

In addition to the leader block window 32, the second housing section 26 further forms an opening 34. The opening 34 facilitates access to the tape reel assembly 14 by a drive chuck portion of a tape drive (not shown). Conversely, the first housing section 24 includes a connector (not shown) extending from an inner face thereof. The connector is positioned opposite the opening 34 and is configured to retain a portion of the brake assembly 18. As is known to those of ordinary skill in the art, in one preferred embodiment, the connector is a tab sized to slidably receive a portion of the brake assembly 18. Alternatively, the connector may assume other forms known in the art, such as a series of teeth.

Leader blocks are also well known in the art. In one embodiment, a front surface of the leader block 20 includes a slot 36 for engaging an automatic threading apparatus of a reel-to-reel magnetic tape drive apparatus (not shown) and engages an inclined surface of the corner 30 of the housing 12. A rear surface 38 is rounded to form a portion of an arc of a radius to match the periphery of the take-up hub (not shown) in the tape drive apparatus as the leader block 22 fits into a slot in the take-up hub. Alternatively, other configurations known in the art for the leader block 22 are equally acceptable. Even further, depending upon a desired configuration of the data storage tape cartridge 10, the leader block 22 may be eliminated, such as with a dual tape reel design.

The tape reel assembly 14 is described in greater detail below, and generally includes an upper flange 40, a lower flange 42 and a hub body 44. The storage tape 16 is wound about the hub body 44, constrained laterally by the flanges 40, 42. Further, the tape reel assembly 14 defines a central opening 46 sized to receive the brake assembly 18. Upon final assembly, the central opening 46 is generally axially aligned with the opening 34 in the housing 12.

The storage tape 16 is preferably a magnetic tape of a type commonly known in the art. For example, the storage tape 16 can consist of a balanced polyethylene naphthalate (PEN) based material coated on one side with a layer of magnetic material dispersed within a suitable binder system, and on the other side with a conductive material dispersed within a suitable binder system. Acceptable magnetic tape is available, for example, from Imation Corp. of Oakdale, Minn.

The brake assembly 18 is known in the art and preferably consists of a spring 50 and a brake body 52. The spring 50 is preferably a coil spring formed to bias the brake body 52 within the central opening 46 of the tape reel assembly 14. In this regard, the brake body 52 preferably includes a toothed surface 54 configured to engage a corresponding portion of the tape reel assembly 14 in a "locked" position.

Figure 2:
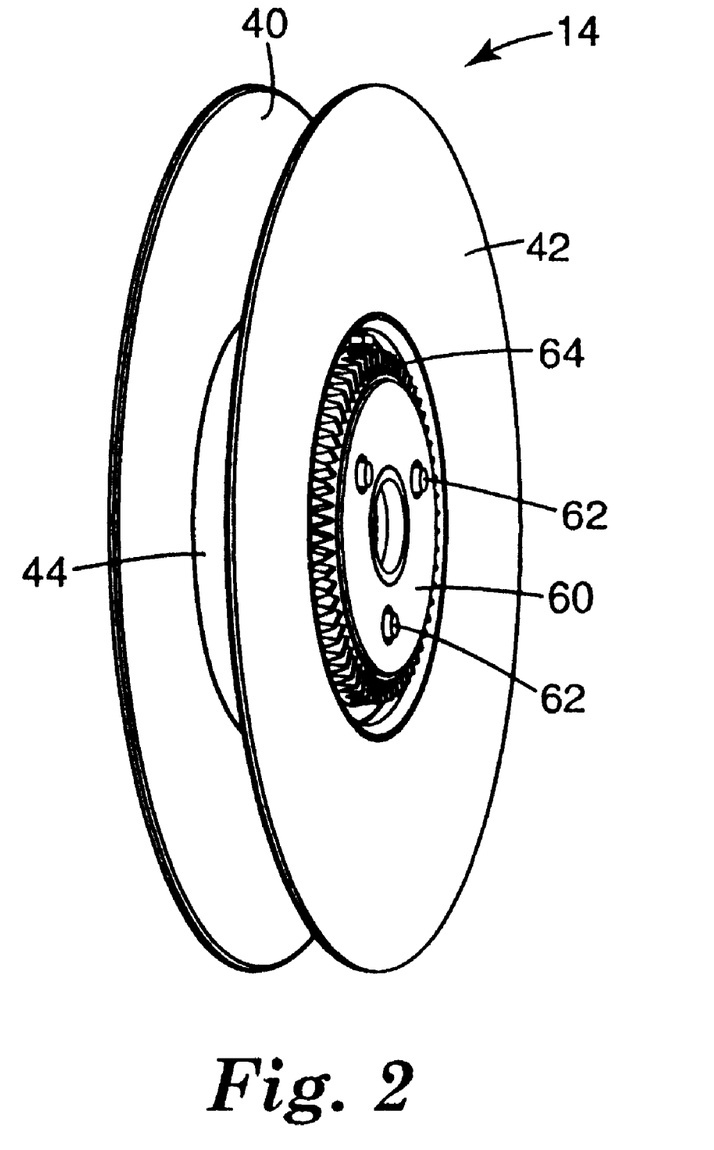
FIG. 2 is a bottom, perspective view of a tape reel assembly in accordance with the present invention associated with the data storage tape cartridge of FIG. 1.

The tape reel assembly 14 is shown in greater detail in FIG. 2. The tape reel assembly 14 includes the opposing flanges 40, 42, the hub body 44 and a metallic ring 60. The upper and lower flanges 40, and 42 are secured to, and extend radially outwardly from, opposite ends of the hub body 44. The metallic ring 60 is preferably secured to the hub body 44, for example by tabs 62. Finally, a toothed section 64 is formed on an outer surface of the hub body 44.

Figure 3A:
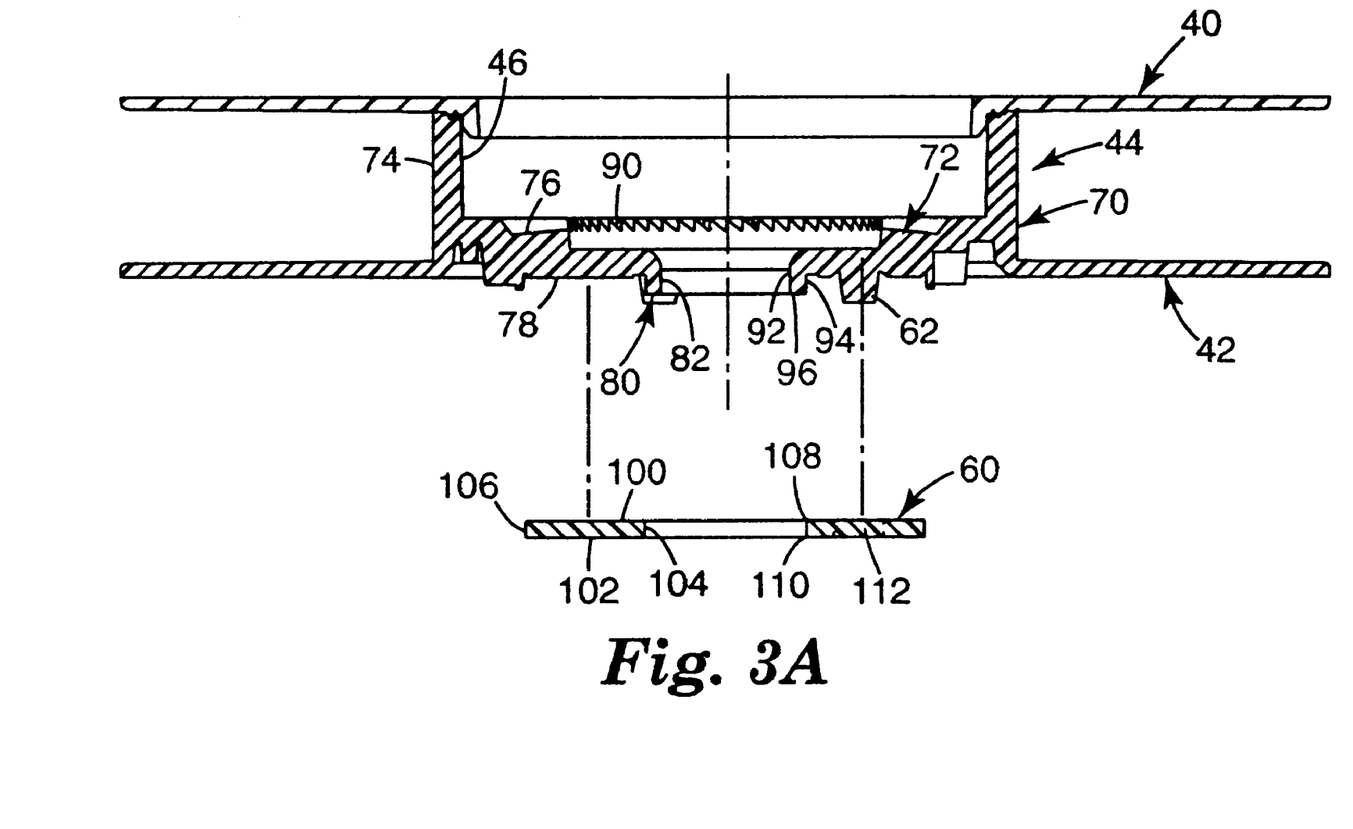
FIG. 3A is an exploded, cross-sectional view of the tape reel assembly of FIG. 2.

As shown in greater detail in the cross-sectional view of FIG. 3A, the hub body 44 is preferably comprised of a hub ring 70 and an engagement section 72. The hub ring 70 is cylindrical and forms a tape-winding surface 74. The engagement section 72 is preferably a web of material extending radially inwardly relative to the tape winding surface 74, and includes an inner surface 76, an outer surface 78, an annular flange 80, and the tabs 62. Finally, the hub body 44 forms the central opening 46, preferably defined by the hub ring 70. As previously described, the central opening 46 is sized to slidably maintain the brake assembly 18 (FIG. 1). The central opening 46 is accessible by a tape drive (not shown) via a central, axial passage 82 formed in the engagement section 72, preferably defined by the annular flange 80.

The inner surface 76 of the engagement section 72 preferably forms a plurality of teeth 90 for selectively engaging the toothed surface 54 of the brake body 52 (FIG. 1). Alternatively, other forms of engagement between the brake body 52 and the engagement section 72 can be provided as known in the art. Similarly, the outer surface 78 of the engagement section 72 forms the toothed section 64 (best shown in FIG. 2). Finally, the annular flange 80 is preferably formed to extend in an axial fashion from the outer surface 78 (or downwardly relative to the orientation of FIG. 3A). As shown in FIG. 3A, the preferred axial extension of the annular flange 80 defines an inner diameter surface 92, an outer diameter surface 94 and a leading end 96. As previously described, the annular flange 80, and in particular the inner diameter surface 92, defines a diameter of the axial passage 82. In one preferred embodiment, the inner diameter surface 92 has a relatively uniform diameter in the range of 0.3–0.5 inch (7.6–12.7 mm), most preferably approximately 0.438 inch (11.12 mm). The outer diameter surface 94 is similarly preferably uniform, having a diameter in the range of approximately 0.4–0.6 inch (10.2–15.2 mm), most preferably approximately 0.540 inch (13.72 mm). Finally, the axial extension of the annular flange 80 generates a height or length, defined by a distance between the outer surface 78 and the leading end 96. In one preferred embodiment, the length of the annular flange 80 corresponds with a thickness of the metallic ring 60. With this in mind, the annular flange 80 preferably has a length in the range of approximately 0.04–0.12 inch (1.02–3.05 mm); most preferably approximately 0.084 inch (2.134 mm). For reasons made clear below, each or all of the above-described preferred dimensions can be altered in accordance with a desired size and shape of the tape reel assembly 14.

Each of the flanges 40, 42 and the hub body 44 are molded from a rigid polymer, preferably ten percent glass filled polycarbonate, although a wide variety of other relatively rigid materials can alternatively be employed, as known in the art, for example acetal. As shown in FIG. 3A, the upper flange 40 is molded separately from the lower flange 42 and the hub body 44, and subsequently assembled thereto. Alternatively, the lower flange 42 can be formed apart from the hub body 44. Even further, although the hub body 44, including the hub ring 70 and the engagement section 72, is preferably integrally formed, the engagement section 72 may be separately formed and subsequently attached to the hub ring 70. Regardless, the annular flange 80 is preferably precision molded to be co-axial with the tape-winding surface 74. This relationship dictates positive, accurate positioning of a tape drive spindle (not shown) by the annular flange 80 relative to the tape-winding surface 74 during use.

The metallic ring 60 is preferably a stainless steel washer. Alternatively, other metallic materials are equally acceptable. Relative to the orientation of FIG. 3A, the metallic ring 60 includes an upper surface 100, a lower surface 102, an inner axial surface 104 and an outer axial surface 106. The upper surface 100 and the inner axial surface 104 combine to define a leading edge 108, whereas the lower surface 102 and the inner axial surface 104 combine to define a trailing edge 110. Although shown in cross section in FIG. 3A, it should be understood that both the leading and trailing edges 108, 110 are circular. Finally, the metallic ring 60 preferably forms a plurality of holes 112 corresponding with the tabs 62 of the hub body 44.

The inner axial surface 104 defines an inner diameter of the metallic ring 60 and preferably corresponds with a diameter of the outer diameter surface 94 of the annular flange 80. Thus, in one preferred embodiment, the inner axial surface 104 of the metallic ring 60 has a diameter in the range of approximately 0.4–0.6 inch (7.6–12.7 mm), most preferably approximately 0.55 inch (14 mm). Alternatively, other diameters, approximating, or preferably slightly larger than, the diameter of the outer diameter surface 94 of the annular flange 80 are acceptable. The outer axial surface 106 of the metallic ring 60 similarly corresponds with a dimension of the engagement section 72, and in one preferred embodiment is in the range of approximately 1.0–1.5 inch (25.4–38.1 mm), most preferably approximately 1.35 inch (34.3 mm). Once again, however, other dimensions are equally acceptable.

Figure 3B:
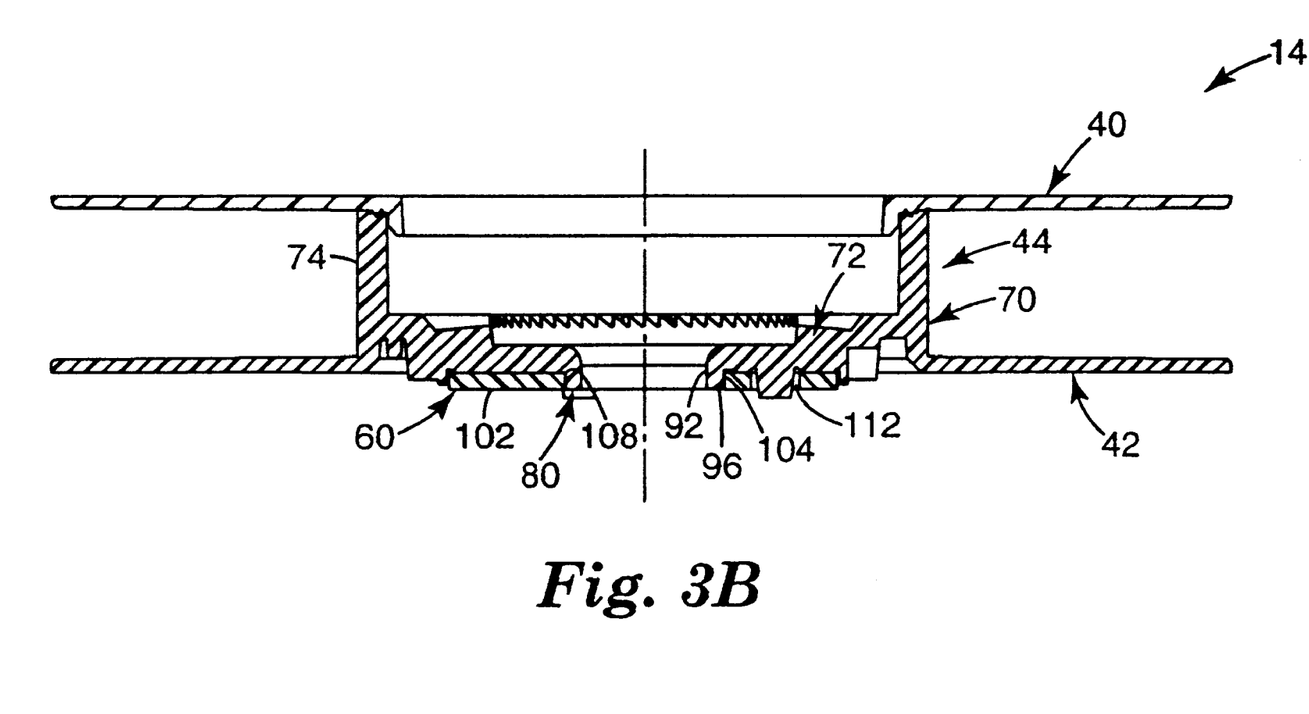
FIG. 3B is a cross-sectional view of the tape reel assembly of FIG. 3A upon final assembly.

As shown in FIG. 3B, the metallic ring 60 is assembled to the engagement section 72 such that the upper surface 100 of the metallic ring 60 abuts the outer surface 78 of the engagement section 72. The tabs 62 extend through the corresponding holes 112 in the metallic ring 60 to secure the metallic ring 60 to the engagement section 72. The tabs 62 are ultrasonically welded to secure the metallic ring 60. Alternatively, other known coupling configurations can be employed.

With reference to FIGS. 3A and 3B, upon final assembly, the annular flange 80 encompasses the leading edge 108 of the metallic ring 60. More particularly, in one preferred embodiment, the annular flange 80 extends within the inner diameter of the metallic ring 60 such that the outer diameter surface 94 of the annular flange 80 abuts the inner axial surface 104 of the metallic ring 60. With this configuration, the annular flange 80 positively positions the metallic ring 60 to be substantially co-axial with the tape-winding surface 74. Further, the length of the annular flange 80 preferably corresponds with a thickness of the metallic ring 60 such that the leading end 96 is substantially flush with the lower surface 102. In a most preferred embodiment, the leading end 96 is slightly recessed from the lower surface 102 by a distance on the order of approximately 0.002 inch, although other relationships are equally acceptable.

As is made clear by FIG. 3B, upon final assembly, the annular flange 80 defines a minimum diameter of the axial passage 82. That is to say, the diameter of the inner diameter surface 92 is less than a diameter of the inner axial surface 104 of the metallic ring 60. This relationship is in direct contrast to prior art tape reel assemblies whereby the metal washers defines the minimum diameter of the axial passage and is thus "exposed". As described in greater detail below, the present invention allows for the annular flange 80 to "protect" the metallic ring 60, and in particular the leading edge 108, during use of the tape reel assembly 14. Notably, this same feature will prevent damage during assembly of the metallic ring 60. For example, a metal shaft (not shown) is typically employed to direct the metallic ring 60 toward, and into engagement with, the engagement section 72. In this regard, the annular flange 80 prevents the metal shaft from inadvertently contacting, and therefore possibly damaging, the metallic ring 60 upon retraction of the metal shaft. In addition, the annular flange 80 allows for a more precise, co-axial alignment between the tape-winding surface 74 and a drive assembly (not shown).

While the annular flange 80 has been preferably described as extending substantially along an entire thickness of the metallic ring 60, other configurations are equally acceptable. For example, a portion of an alternative embodiment tape reel assembly 120 is depicted in cross-section in FIG. 4. The tape reel assembly 120 includes, in part, a hub body 122 and a metallic ring 124. The hub body 122 includes a hub ring 126 and an engagement section or web 128. The engagement section 128 extends radially inwardly from the hub ring 126 and includes an inner surface 130, an outer surface 132 and an annular flange 134. The metallic ring 124 includes an upper surface 136, a lower surface 138, an inner axial surface 140 and an outer axial surface 142. The metallic ring 124 is assembled to the engagement section 128 such that the upper surface 136 abuts the outer surface 132 of the engagement section 128. In this regard, an inner groove 144 and an outer groove 146 are formed along the upper surface 136.

Figure 4:
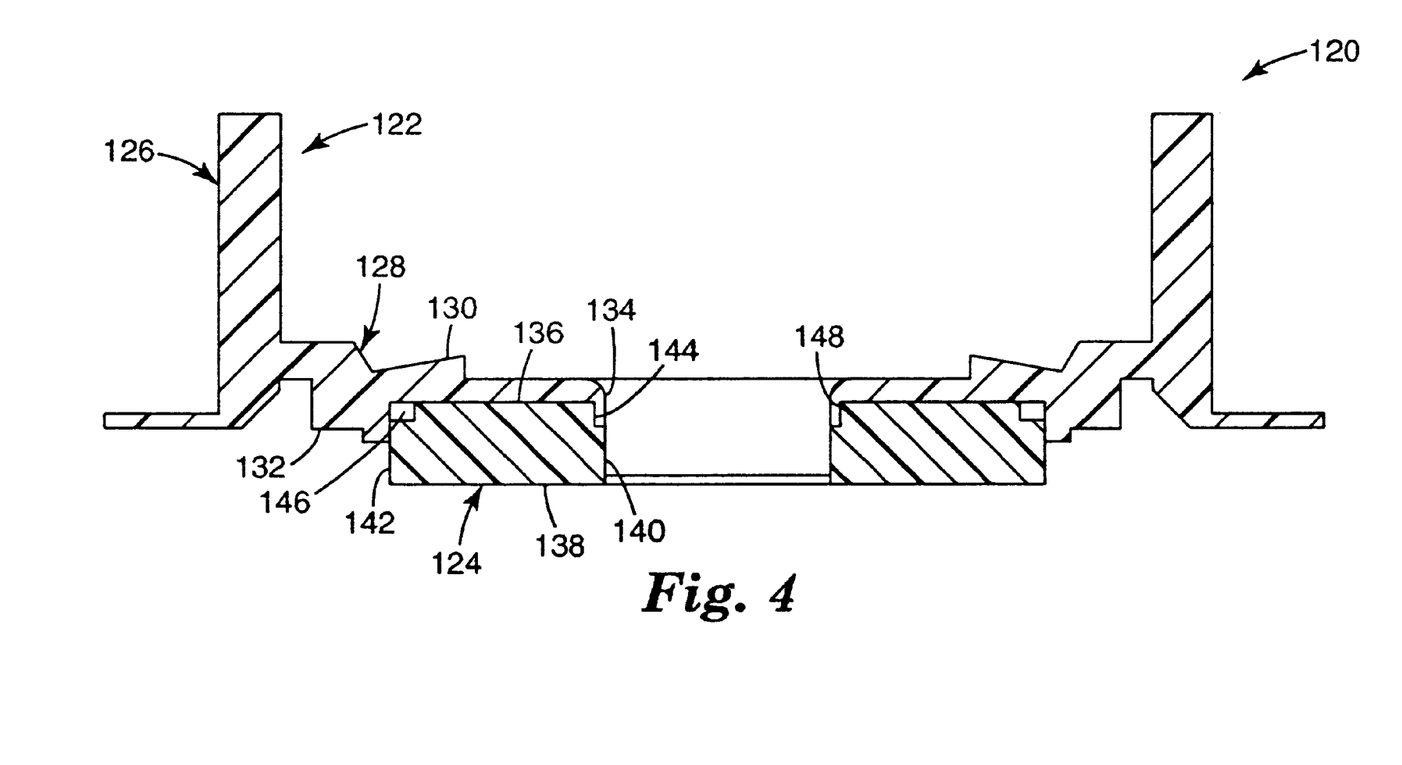
FIG. 4 is a cross-sectional view of an alternative tape reel assembly in accordance with the present invention.

Unlike the annular flange 80 of FIGS. 3A and 3B, the annular flange 134 has a length that is less than a thickness of the metallic ring 124. However, similar to the annular flange 80, the annular flange 134 is configured to encompass a leading edge 148 of a metallic ring 124, formed at the inner groove 144. Thus, upon final assembly, the annular flange 134 has an inner diameter that is less than a diameter of at least a portion of the inner axial surface 140 of the metallic ring 124. To this end, the inner groove 144 is sized to receive the annular flange 134 to facilitate assembly thereof. In one further preferred embodiment, the outer groove 146 is provided as an assembly orientation feature. Alternatively, however, the outer groove 146 can be eliminated.

Figure 5A:
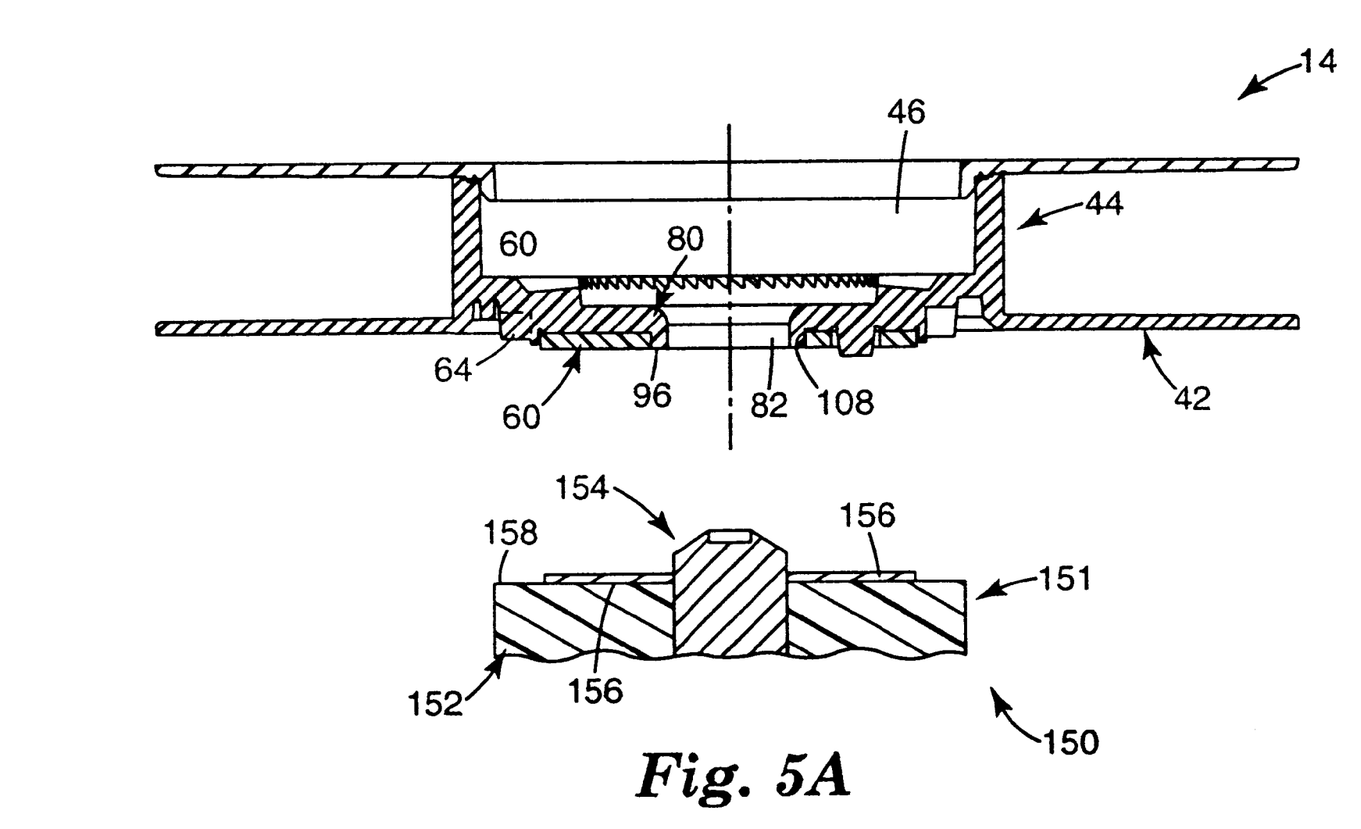
FIG. 5A is a cross-sectional view of a tape drive system including the tape reel assembly of FIG. 2 and a portion of a tape drive prior to engagement.
Figure 5B:
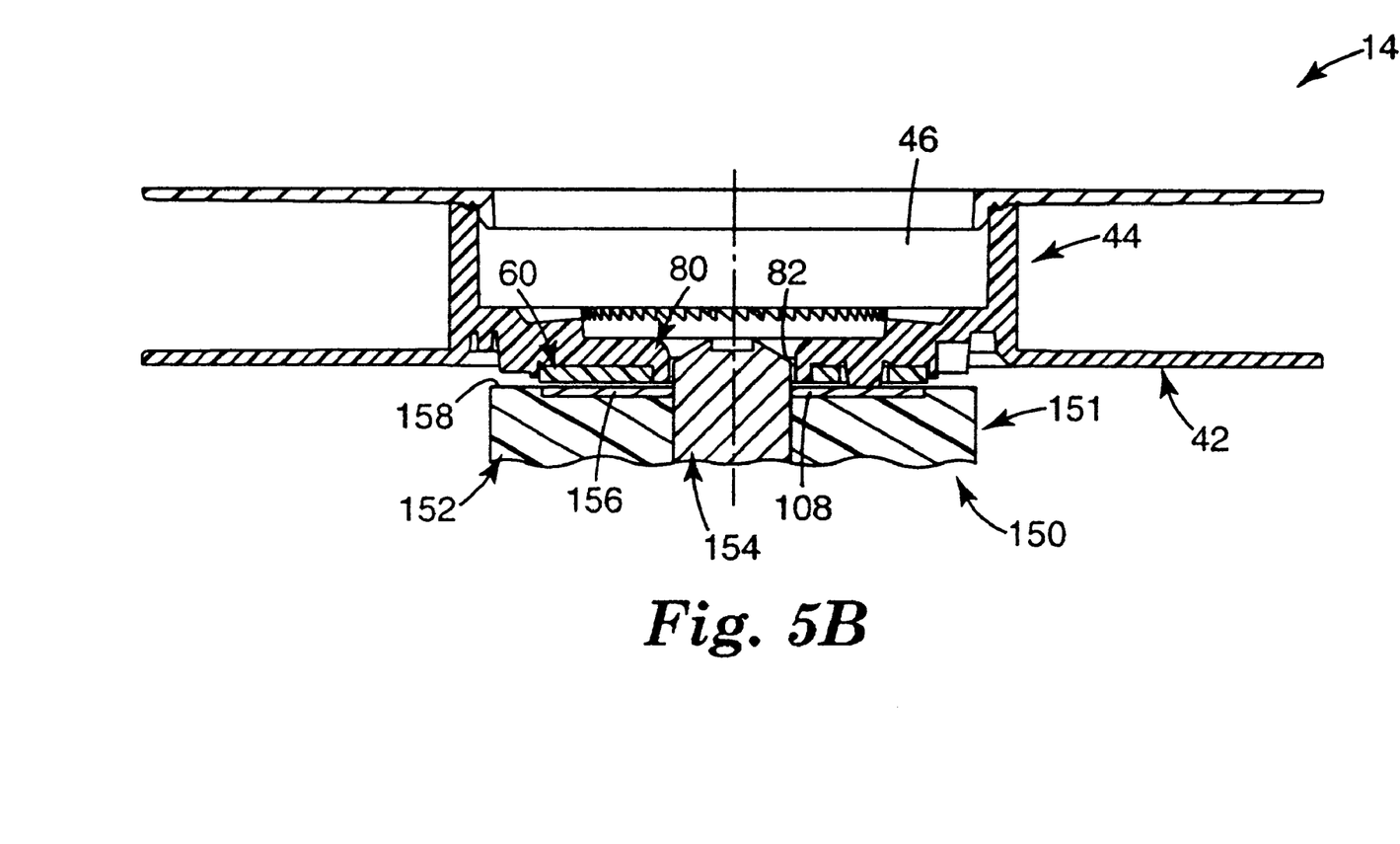
FIG. 5B is a cross-sectional view of the tape drive system of FIG. 5A, depicting the tape reel assembly engaged by the tape drive.

Use of the tape reel assembly 14 in accordance with the preferred embodiment in conjunction with a tape drive 150 is shown in FIGS. 5A and 5B. For ease of illustration, only a drive chuck 151 portion of the tape drive 150 is depicted, and includes a drive hub 152, a metal post 154 and a magnet 156. As is well known in the art, the drive hub 152 is rotatable about the post 154 and defines teeth 158 sized to mesh with the toothed section 64 of the tape reel assembly 14. Similarly, the magnet 156 is sized to magnetically attract the metallic ring 60. Finally, the post 154 is configured to passage through the axial passage 82 and into the central opening 46 direct the brake assembly 18 (FIG. 1) from the locked position.

Use of the data storage tape cartridge 10 (FIG. 1) in conjunction with the tape drive 150 begins with insertion of the data storage tape cartridge 10 such that the tape reel assembly 14 is axially aligned with the drive chuck 151 as shown in FIG. 5A. Upon activation of the tape drive 150, the drive chuck 151 is maneuvered toward the tape reel assembly 14 such that the post 154 is inserted into the axial passage 82 in axial fashion. In this regard, the annular flange 80 provides a guide surface at the leading end 96 for directing the post 154 into the axial passage 82 such that the post 154 is axially aligned with a central axis of the tape reel assembly 14. Effectively, then, the annular flange 80 co-axially aligns the post 154 relative to the tape-winding surface 74, due to the precision molding of the hub 44. This is in contrast to prior art tape reel assemblies in which the metallic ring is relied upon to position the post 154. Further, the preferred extension of the annular flange 80 substantially prevents contact between the post 154 and the metallic ring 60.

Axial movement of the drive chuck 151 continues (upwardly relative the orientation of FIG. 5A) until the teeth 158 of the drive hub 152 engage the toothed section 64 of the tape reel assembly 14. Magnetic attraction between the magnet 156 and the metallic ring 60 causes the tape reel assembly 14 to remain associated with the drive chuck 151 (it being understood that a small gap preferably exists between the magnet 156 and the metallic ring 60). In this engaged position of the drive chuck 151 relative to the tape reel assembly 14, the post 154 directs the brake assembly 18 (FIG. 1) to an unlocked position such that the tape reel assembly 14 is free to rotate. The drive hub 152 is then rotated at a desired speed and in a desired direction during various data storage/retrieval operations. During rotation of the drive hub 151, and thus of the tape reel assembly 14, the annular flange 80 substantially prevents the post 154 from contacting the metallic ring 60, especially at the leading edge 108.

Upon completion of the data storage tape cartridge 10 operations, the metallic ring 60 is separated from the magnet 156, and the drive chuck 151, including the post 154, retracted axially (downwardly relative to the orientation of FIG. 5B). During this retraction operation, the annular flange 80 serves as a guard, preventing the post 154 from contacting the leading edge 108 of the metallic ring 60. Thus, unlike prior art tape reel assembly designs, the annular flange 80 effectively eliminates the possibility that the metal-based post 154 will undesirably contact the metallic ring 60. Thus, the post 154 will not accidentally draw the metallic ring 60 away from the hub body 44.

In accordance with the preferred embodiment, the annular flange 80 or 134 (FIG. 4) serves as both a guard and an alignment body for positively aligning the drive assembly relative to the tape-winding surface 74 of the hub body 44. In fact, because the metallic ring 60 preferably no longer dictates an axial position of the drive assembly, the annular flange 80 eliminates the need to precisely center the metallic ring 60. To this end, the annular flange 80 is preferably formed as an integral component of the hub body 44, and in particular, the engagement section 72. Alternatively, however, the annular flange 80 can be replaced by a separate guard piece encompassing the leading edge 108, 148 of the metallic ring 60, 124, respectively.

The data storage tape cartridge, and in particular the tape reel assembly, of the present invention provides a marked improvement over previous designs. Formation of an annular flange to encompass at least the leading, inner edge of the metallic ring associated with the tape reel assembly effectively eliminates opportunities for damage to the metallic ring during both assembly and use. In addition, in accordance of one preferred embodiment, the annular flange positively aligns a drive assembly relative to the tape-winding surface of the tape reel hub. Finally, in accordance with another preferred embodiment, the annular flange serves as a guide for directing a tape drive hub post into the central opening of the tape reel assembly.

Although the present invention has been described with reference to preferred embodiments, workers skilled in the art will recognize that changes can be made in form and detail without departing from the spirit and scope of the present invention. For example, the tape reel assembly of the present invention has been described with reference to a single reel data storage tape cartridge. Alternatively, the disclosed assembly design can be incorporated into a dual-reel data storage tape cartridge. Further, preferred dimensions have been ascribed to certain components of the tape reel assembly in accordance with one preferred data storage tape cartridge size (or form factor). Of course, depending upon a particular application, a different form factor (either larger or smaller) may be specified. Under these circumstances, the tape reel assembly of the present invention, and thus the various components, will assume appropriate, corresponding dimensions. In addition, the metallic ring or washer can be sized and shaped to accommodate varying formations of the guard of the present invention.

What is claimed is:

1. A tape reel assembly for use with a data storage tape cartridge, the tape reel assembly comprising:
   a hub ring defining a tape-winding surface and forming a central opening;
   an engagement section extending substantially radially inwardly relative to the tape winding surface and including an inner surface, an outer surface and an annular flange extending substantially axially from the outer surface, the annular flange defining an axial passage;
   a metallic ring secured to the outer surface of the engagement section, the metallic ring having an inner diameter greater than a diameter of the axial passage such that the annular flange extends axially within the inner diameter of the metallic ring; and
   opposing flanges extending radially from opposite ends of the hub ring, respectively.

2. The tape reel assembly of claim 1, wherein the tape-winding surface and the annular flange are axially aligned.

3. The tape reel assembly of claim 1, wherein the hub ring and the engagement section are integrally formed.

4. The tape reel assembly of claim 1, wherein axial extension of the annular flange from the outer surface defines an axial length, and further wherein the axial length corresponds with a thickness of the metallic ring.

5. The tape reel assembly of claim 4, wherein the annular flange terminates in a leading end opposite the outer surface, and further wherein a relationship between the axial length and the thickness of the metallic ring is such that the leading end of the annular flange is substantially flush with a bottom surface of the metallic ring.

6. The tape reel assembly of claim 1, wherein the annular flange has a radial thickness such that the annular flange defines an inner diameter surface and an outer diameter surface, and further wherein at least a portion of the inner diameter of the metallic ring abuts the outer diameter surface of the annular flange.

7. The tape reel assembly of claim 6, wherein the inner diameter of the metallic ring and the outer diameter of the annular flange are substantially uniform.

8. The tape reel assembly of claim 6, wherein the metallic ring includes an inner axial surface defining the inner diameter, the inner axial surface forming a groove configured to receive the annular flange.

9. The tape reel assembly of claim 1, wherein the metallic ring forms an inner, leading edge positioned adjacent the engagement section, and further wherein the annular flange is configured to encompass the inner, leading edge.

10. The tape reel assembly of claim 1, wherein the annular flange is configured to form a guide surface for directing a body through the axial passage and into the central opening.

11. A data storage tape cartridge comprising:
    a housing defining an enclosure;
    at least one tape reel assembly disposed within the housing, the tape reel assembly including:
       a hub ring defining a tape-winding surface and forming a central opening,
       an engagement section extending substantially radially inwardly relative to the tape-winding surface and including an inner surface, an outer surface and an annular flange extending substantially axially from the outer surface, the annular flange defining an axial passage,
       a metallic ring secured to the outer surface of the engagement section, the metallic ring having an inner diameter greater than a diameter of the axial passage such that the annular flange extends axially within the inner diameter of the metallic ring,
       opposing flanges extending radially from opposite ends of the hub ring, respectively; and
    a storage tape wound about the tape-winding surface.

12. The data storage tape cartridge of claim 11, wherein the tape-winding surface and the annular flange are axially aligned.

13. The data storage tape cartridge of claim 11, wherein the hub ring and the engagement section are integrally formed.

14. The data storage tape cartridge of claim 11, wherein axial extension of the annular flange from the outer surface defines an axial length, and further wherein the axial length corresponds with a thickness of the metallic ring.

15. The data storage tape cartridge of claim 11, wherein the annular flange has a radial thickness such that the annular flange defines an inner diameter surface and an outer diameter surface, and further wherein at least a portion of the inner diameter of the metallic ring abuts the outer diameter surface of the annular flange.

16. The data storage tape cartridge of claim 15, wherein the metallic ring includes an inner axial surface defining the inner diameter, the inner axial surface forming a groove configured to receive the annular flange.

17. The data storage tape cartridge of claim 11, further comprising:

a brake body positioned within the central opening of the hub ring, the brake body including a toothed portion;

wherein the inner surface of the engagement section includes teeth for selectively engaging the toothed portion of the brake body.

18. A tape reel assembly for use with a data storage tape cartridge, the tape reel assembly comprising:

a hub body including:

a hub ring defining a tape-winding surface and opposing first and second ends, an engagement section extending substantially radially inwardly relative to the tape winding surface adjacent the first end, the engagement section including an inner surface and an outer surface, wherein the hub body forms a central opening for receiving a brake body, the central opening being accessible through an axial passage in the engagement section;

a metallic ring secured to the outer surface of the engagement section such that the metallic ring is generally axially aligned with the central opening, the metallic ring forming leading and trailing inner edges, the leading inner edge being positioned adjacent the engagement section;

a guard encompassing the leading inner edge of the metallic ring, the guard configured to substantially prevent a drive chuck post from contacting the leading inner edge of the metallic ring upon insertion into the central opening; and first and second flanges extending radially outwardly from the first and second ends of the hub ring, respectively.

19. The tape reel assembly of claim 18, wherein the guard is an annular flange formed along the engagement section.

20. The tape reel assembly of claim 18, wherein the guard defines a minimum diameter of the axial passage.

* * * * *